Sept. 24, 1968 W. C. G. VAN WELDEREN RENGERS ET AL 3,403,065
WALLBOARD AND APPARATUS FOR MANUFACTURE THEREOF
Filed July 10, 1964 2 Sheets-Sheet 1
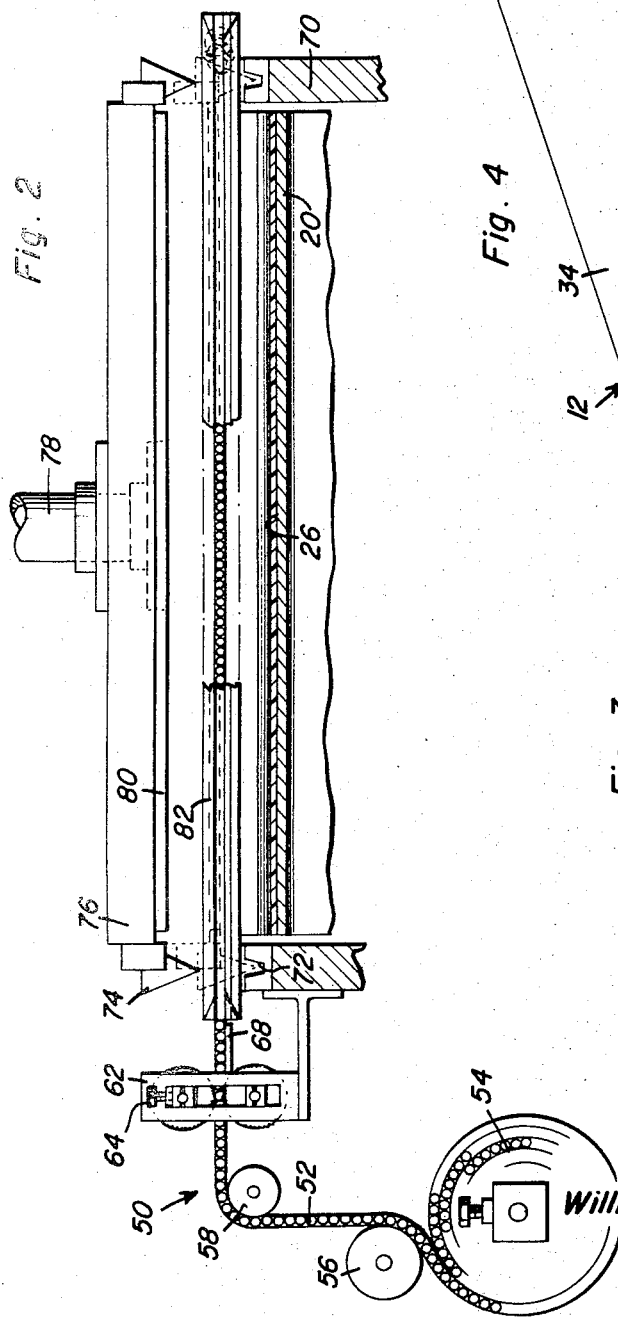
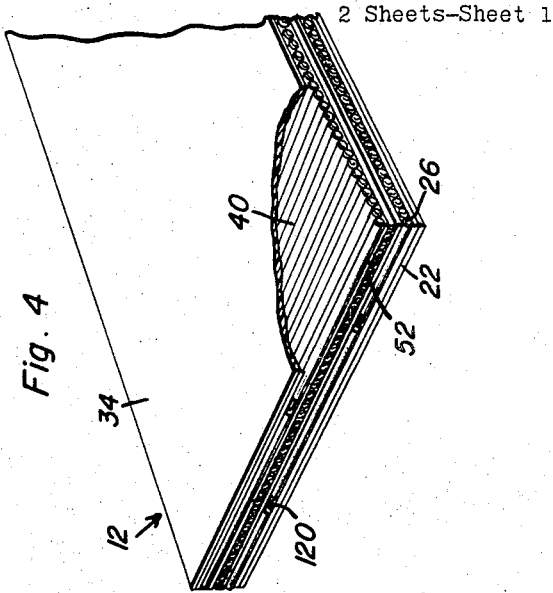
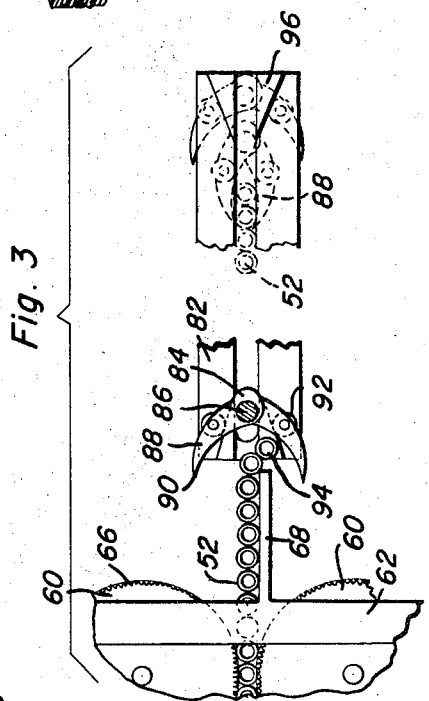
William C.G. VanWelderen Rengers
James McColl
INVENTORS

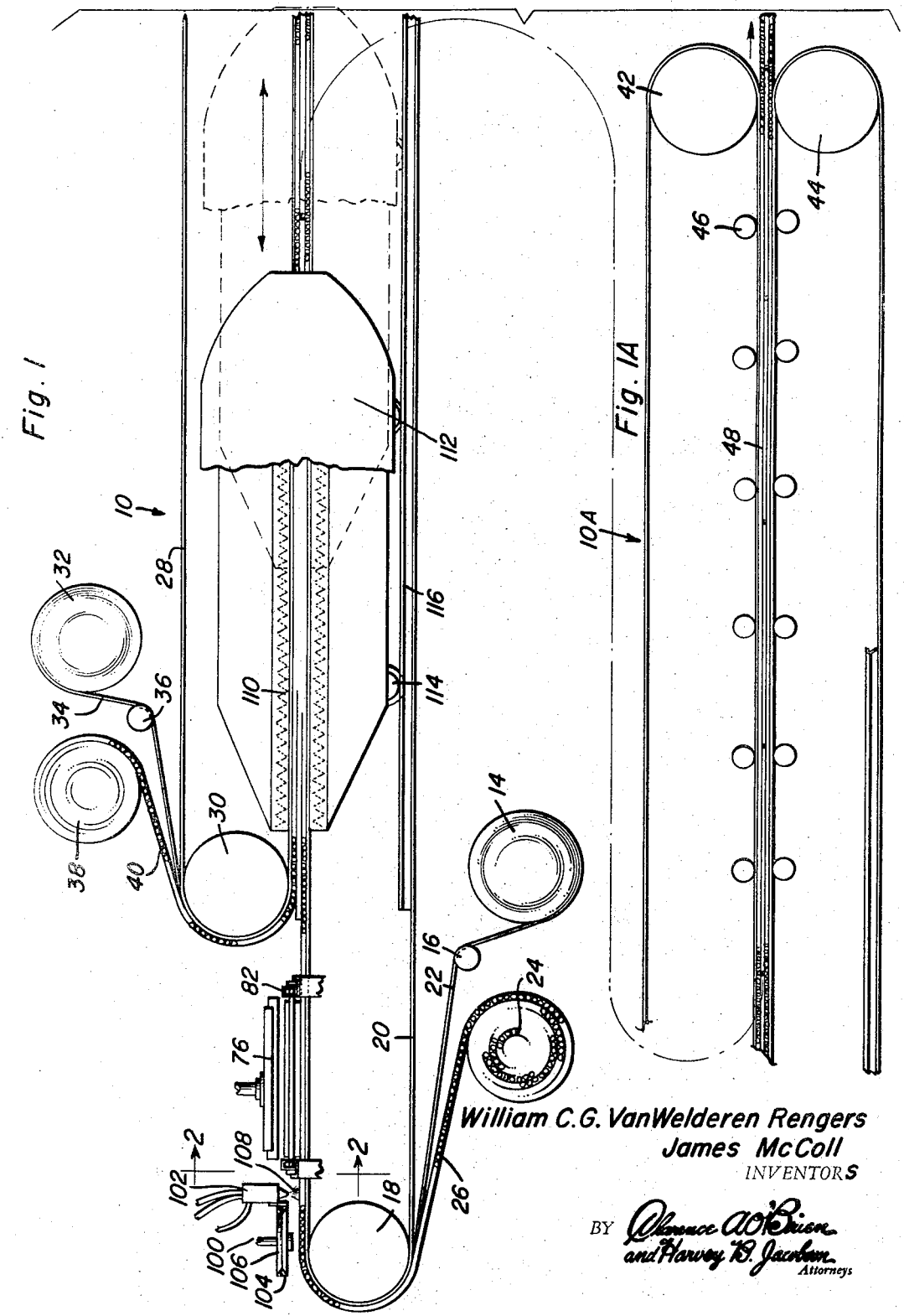

3,403,065
WALLBOARD AND APPARATUS FOR
MANUFACTURE THEREOF
William C. G. Van Welderen Rengers and James McColl,
Portsmouth, Va., assignors of thirty percent each to
Donald L. Mason and Charles Lydon Harrell, Jr.,
Norfolk, Va.
Filed July 10, 1964, Ser. No. 381,694
5 Claims. (Cl. 156—555)

ABSTRACT OF THE DISCLOSURE

A wallboard with an insulation core of expanded foam plastic and tubular cells forming a reinforcement for the foam plastic and having an insulation value at least equal to the foam plastic. An apparatus for making wallboard including a conveyor on which a layer of tubular member is placed and foam-type plastic material with facing sheets associated therewith together with a movable press for moving the laminated wallboard longitudinally at the speed of formation thereof and for heating and pressing the components of the wallboard into final configuration.

---

The present invention generally relates to a building panel such as wallboard together with a novel apparatus for forming the same following a procedure different from procedures normally used in making wallboard.

The primary object of the present invention is to provide a wallboard panel having an insulation core of expanded foam plastic such as urethane or equivalent plastics having adherent qualities between the cells of the structure equivalent to urethane with the insulation core having a reinforcement incorporated therein with the reinforcement material having at least the same insulation qualities or value as the core itself thereby serving not only to reinforce the core which is of somewhat brittle material but also to enhance the insulation qualities of the wallboard.

Another primary object of the present invention is to provide an apparatus and procedure for forming the wallboard incorporating into its construction a continuous operation for producing a continuous panel of wallboard in which a movable mold for curing the wallboard panel reciprocates in such a manner that the material forming the wallboard may be continuously fed into the apparatus.

Still another object of the present invention is to provide a wallboard and apparatus for forming the same having a movable press which moves back and forth at a predetermined rate for enabling continuous operation of the process.

Yet another object of the present invention is to provide a wallboard and apparatus for forming the same which is relatively simple in construction, easy to operate, efficient and relatively inexpensive to maintain as well as to initially construct.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1 and 1A represent a side elevational schematic view of the apparatus forming the wallboard of the present invention with portions thereof broken away for clarity;

FIGURE 2 is a transverse, sectional view taken substantially upon a plane passing along section line 2—2 of FIGURE 1 illustrating the orientation of the mechanism for pulling the cross-fed tubular members across the wallboard panel together with a means for cutting off the cross-fed tubular members at the desired length;

FIGURE 3 is a schematic illustration of the mechanism for picking up and pulling the cross-fed tubular insulating members; and FIGURE 4 is a perspective view of one end portion of a wallboard panel constructed in accordance with the present invention with portions thereof broken away.

Referring now specifically to the drawings, the numerals 10 and 10A disclose the apparatus for forming a wallboard panel 12 as illustrated in FIGURE 4.

The apparatus is shown schematically but in sufficient detail to enable an understanding of the invention. The apparatus includes a supply roll or spool 14 for a facing paper which extends over an idler roller 16 and then around an end roller 18 which receives an endless conveyor belt 20 of any suitable construction. Thus, the facing paper 22 is pulled off of the spool 14, over the roller 16 and around the end roller 18 along the top run or flight of the endless belt 20. Disposed adjacent to but under the facing paper 22 is provided a supply spool or roll 24 of tubular members 26 which are stitched together with wire stitching in that the tubular members 26 are secured together in side-by-side relation thereby forming a continuous mat or assembly which may be considered a strip or panel constructed of a series of side-by-side tubular members secured together by metal wire stitching. The strip of tubular members 26 also extends around the end pulley 18 against the conveyor belt 20 in overlying relation to the facing paper 22.

Disposed above the conveyor belt 20 is another endless conveyor belt 28 extending around an end roller or pulley 30 spaced longitudinally inwardly from the end pulley or roller 18. Disposed above the belt 28 is a supply roll 32 of upper facing paper 34 which is entrained over an idler roller 36 and then around the outer surface of the conveyor belt 28 in underlying relation to the lower flight thereof which is disposed in spaced relation to the upper flight of the lower conveyor belt 20. Adjacent the supply roll 42 for the facing paper 34 is a supply roll or spool 38 for an upper strip or panel of tubular members designated by numeral 40 which also goes around the end pulley or roller 30 and along the lower flight of the endless belt 28 below the facing paper 34.

The belt 28 is entrained over an end roller or pulley 42 at the opposite end thereof and the lower belt 20 is entrained over an end roller or pulley 44 at the opposite end thereof as illustrated in FIGURE 1A and a plurality of idler rollers 46 are disposed on opposite surfaces of the wallboard panel 48 formed by the apparatus of the present invention for retaining the wallboard in proper thickness during complete curing thereof.

Intermediate the rollers 18 and 30 there is provided a cross-feeding mechanism generally designated by numeral 50 for feeding a strip of tubular members 52 similar to the tubular member strip 26 and 40 which is also provided with tubular members stitched together by metal stitching which is also true of the strip or panel 40. The strip or panel 52 is provided on a supply spool or roller 54 and is entrained between idler rollers 56 and 58 and then between a pair of vertically disposed tensioning rollers 60 which are mounted on suitable slotted brackets 62 together with an adjustment mechanism 64 for adjusting the pressure of the roller 60 against the strip or panel 52 as it passes therethrough. The peripheral surfaces of the roller 60 are serrated as at 66 for assuring that the tubular strip 62 will be retained in position thereby preventing the supply roller or spool 54 from turning counterclockwise by gravity or the like for pulling the strip 52 out from between the rollers 60.

Projecting laterally from the bracket 62 is a supporting ledge 68 thereon for the terminal end of the tubular strip 52 with the supporting ledge 68 having a length less than the overall width of the strip or panel 52 of tubular members.

Alongside of the upper flight of the conveyor belt 20, guide mechanism 70 are provided which have channel-shaped recesses 72 on the upper surface thereof for receiving an elongated shearing blade 74 mounted on the ends of a carrier bar 76 that is actuated by a suitable hydraulic piston and cylinder assembly 78 or the like whereby depression of the blades 76 will sever the strip 52 at the two channels 72 whereby the severed portion of the strip will have a length substantially equal to the width of the strips 26 and 40.

The bar 76 is provided with an electromagnet 80 incorporated therein which will retain the severed portion of the strip or panel 52 above the continuous strip or panel 26 until the proper time at which time the electromagnet 80 will be deenergized thus dropping the severed portion of the strip 52 of tubular members in which case the cross-fed severed portions will be disposed in end-to-end relation thereby forming a continuous intermediate layer of tubular members which have the longitudinal axes thereof perpendicular to the tubular members in the upper layers or strips. The metal wire stitching is to secure the tubular members 52 together thereby enabling the cross-fed tubular members to be severed but retained in elevated position above the lower layer until the preceding cross-fed panel has moved longitudinally to a point just beyond the edge of the severed portion of the strip 32 adjacent the roller 30 whereupon the severed portion of the strip 52 will be dropped onto the moving structure and become a part thereof.

A mechanism for pulling the strip 52 across the conveyor 20 is provided and this includes a transverse trackway 82 having a carrier or slide 84 movable therein with the slide 84 including a transverse rod 86 having a pair of gripping fingers 88 at each end thereof. The gripping fingers 88 are pivotally mounted on the rod 86 and are provided with tapered or possibly pointed terminal end portions 90 and the fingers 88 are generally arcuately curved as illustrated in FIGURE 3 whereby the fingers 88 will effectively grip the tubular strip 52 when they are in closed position. Suitable axial spring means or the like are employed for retaining the fingers 88 in gripping relation as illustrated in dotted lines in FIGURE 3 and each of the fingers 88 is provided with a cam engaging roller 92 thereon for engaging inclined cam surfaces 94 and 96 respectively at the ends of the trackway 82. Thus, when the carrier 84 approaches the right hand end of the trackway 82 with the fingers 88 gripping the strip 52, the rollers 92 will engage the inclined surfaces of the wedges or cams 96 thus spreading the fingers apart and releasing the strip 52. Then as the carriage 84 approaches the left-hand end of the trackway 82 in FIGURE 2, the rollers 92 will engage the inclined surfaces of the cams or wedges 94 thus again opening the fingers 88. The fingers 88 are disposed outwardly beyond the supporting ledge 58 so that they will not interfere therewith. Further, the reciprocation of the carriage 84 may be effected by a continuous belt-type drive structure for moving the carriage 84 back and forth with the relationship of the fingers 88, rollers 92 and cams 94 being such that the fingers 88 will move beyond the cut-off point of the blade 74 and the fingers 88 open to such a degree that they will pass above and below the end of the strip 52 even if it is hanging slightly downwardly beyond the end of the ledge 68. Then when the carrier 84 retracts, the fingers 88 and particularly the lower finger will pick up the strip 52 gripping the strip 52 and pulling it laterally to again be released at the opposite side of the conveyor belt 20.

On the side of the transverse feed structure 50 towards the end roller 18, there is provided a dispensing mechanism 100 for the foam plastic material including a nozzle 102 and an endless belt 104 entrained over a pair of end pulleys 106 whereby as the nozzle 102 proceeds back and forth across the upper surface of the strip or panel 26, the foam plastic material will be discharged onto the layer or strip or panel 26 in a zig-zag manner. The foam plastic 108 is liquid in form and has a resin material therein including a catalyst and plastic material which is not yet expanded and this material will form an adhesive action to serve to retain the cross-fed portion of the strip 52 when it is deposited thereon. After the cross-fed strip has been placed thereon, the strip 40 and facing paper 34 are orientated in position and the laminated wallboard structure then is received between the heated platen 110 of a movable press 112 carried by suitable supporting wheels 114 on a guide trackway 116. The heated platen 110 will not only apply pressure to the facing panels 34 and 22 but will also serve to trigger the foaming action of the foam plastic material which due to generation of heat during the foaming action will serve not only to further heat the panel for curing but also introduce pressure into the panel thereby serving to provide a relatively dense cellular plastic structure with the tubular members forming a reinforcement therefor and having insulation qualities substantially equal to the foamed plastic. The movable press 112 will move towards the rollers 42 and 44 at the speed of formation of the wallboard thereby serving to complete the laminated wallboard structure during its movement towards the rollers 42 and 44. After it has moved for a predetermined distance, such as its own length, the platens 110 are moved apart and the press 112 returned at a high rate of speed to its original position to pick up the next formed segment of the insulation panel. Of course, there will be a certain degree of overlap insofar as the segments are concerned in order for the wallboard panel to be completed, formed and cured during movement of the movable press. Thus, a continuously operating process is formed with the apparatus forming a continuous wallboard panel. The foam plastic material will expand to completely fill the space between the facing papers and it is pointed out that additional layers of transverse and longitudinal tubular members may be supplied by introducing additional longitudinal supply assemblies and crossfeed supply assembly and in the event more than three layers are employed, it will be necessary to also include additional nozzles for introducing the foam plastic material in its liquid state thereby assuring that a continuous core of expanded foam monocellular structure is formed to provide a wallpanel having a relatively high insulating value and also a relatively high strength value with the facing panels and tubular members serving to reinforce the insulating core and prevent breakage and damage thereto. Even with this structure, the wallboard panel is capable of receiving fasteners or nails without material damage thereto and without material damage to the insulation qualities of the wallboard thereby providing a wallboard that is not only highly insulative but capable of receiving fasteners or the like for supporting articles on the wallboard. Also, the wallboard panel may be easily provided with decorative coverings if desired such as simulated wood graining on one or both of the facing papers for producing an article having finished properties for use as an interior wall or the like.

Each of the tubular members forming a strip or panel is provided with a plurality of nodules 120 which serve to form a plurality of airtight compartments in each tubular member. Such nodules may be in the form of constricted portions in tubular plastic members or may be nodules found in naturally growing reeds which have hollow compartments formed in this manner.

The mechanism pertaining to the movement of the press is omitted for clarity and may be any suitable type of chain and sprocket mechanism and a suitable mechanism to return the press at a high rate of speed. The speed of this machine would be variable from 6 to 12 feet per minute and the width of a standard would be 4 feet which, of course, could be varied. Any suitable cut-off mechanism may be provided for cutting off the wallboard to desired lengths when discharged from the machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

For example, the reeds are described as being connected together by wire stitching but metal, plastic or natural thread may be used to fasten the reeds or hollow reinforcing tubes. There also is a possibility that the insulation value of the foam material may vary. However, the reeds or tubular members have an insulating value equal to most of the common presently used foam insulating materials.

What is claimed as new is as follows:

1. An apparatus for forming a laminated wallboard of the type having spaced parallel facing sheets with an insulating core therebetween comprising a body of foam plastic material and a plurality of reinforcing tubular members having an insulation value at least equal to the foam plastic, said apparatus comprising a conveyor belt, supply means for a bottom facing sheet, means feeding the bottom facing sheet onto the conveyor belt, supply means for an assembled web of tubular members, means seating the web of tubular members onto the bottom facing sheet on the conveyor belt, means discharging foam plastic material onto the web of tubular members on the bottom facing sheet substantially throughout the width thereof, supply means for an upper facing sheet, means feeding the upper facing sheet onto the foam plastic material, web of tubular members and lower facing sheet on the conveyor belt, and heat and pressure applying means for pressing the components of the wallboard together and applying heat thereto for final curing and shaping of the wallboard, said heat and pressure applying means being independent of but selectively movable with the conveyor belt for applying heat and pressure while moving in the direction of movement of the conveyor belt and then returning to starting position thereby providing a continuing operation.

2. The structure as defined in claim 1 wherein said means feeding the upper facing sheets including an upper conveyor belt disposed in parallel spaced relation to the first mentioned conveyor belt, said heat and pressure applying means disposed for engagement with the undersurface of the first mentioned conveyor belt and the upper surface of the upper conveyor belt.

3. The structure as defined in claim 2 wherein said means for feeding foam plastic onto the web of tubular members and lower facing sheets including a discharge nozzle, and means moving the discharge nozzle in a reciprocatory manner across the web of tubular members and lower facing sheet for applying the foam plastic thereto in a zig-zag pattern.

4. The structure as defined in claim 3 together with means supplying an additional web of tubular members transversely of the first mentioned web of tubular members to provide a wallboard having a multiple of layers of tubular members.

5. The structure as defined in claim 4 wherein said means for supplying a second layer of tubular members including supply means, means gripping the end of the second web of tubular members and moving it transversely of the first mentioned web of tubular members, and means cutting the transverse web of tubular members to a length substantially equal to the width of the first mentioned web of tubular members.

References Cited

UNITED STATES PATENTS

| 1,450,582 | 4/1923 | Dorn | 161—139 |
| 2,095,369 | 10/1937 | Quinn | 161—139 |
| 2,983,636 | 5/1961 | Runton. | |

FOREIGN PATENTS

| 690,384 | 7/1964 | Canada. |
| 1,200,866 | 12/1959 | France. |

MORRIS SUSSMAN, *Primary Examiner.*